3,187,065
POLYMER COMPRISING ALTERNATING POLY-
URETHANE AND POLYCARBONATE GROUPS
AND PROCESS FOR MAKING THE SAME
Norman Spencer McPherson, Margaret Loudon Clachan, Keith Reid Tatchell, and Terence Arnold Abbott, all of Manningtree, England, assignors to Bexford Limited, Brantham, Manningtree, Essex, England
No Drawing. Filed Sept. 26, 1960, Ser. No. 58,207
Claims priority, application Great Britain, Sept. 30, 1959, 33,206/59
12 Claims. (Cl. 260—857)

This invention relates to synthetic polymeric materials and more particularly to the provision of a new class of said materials which contain a multiplicity of urethane and carbonate linkages in random block distribution, and to the production thereof.

According to a first feature of the present invention there are provided synthetic polymeric materials which contain a multiplicity of organic nuclei of which the majority are aromatic, linked together by urethane and carbonate linkages in random block distribution. The aromatic nuclei are preferably predominantly divalent diarylene alkane radicals, e.g. 1,1-diphenylene-1,1-dimethyl methane radicals. Products of particular value are those which contain divalent diarylene alkane radicals linked together by carbonate linkages and aromatic, aliphatic or aryl aliphatic radicals linked thereto by urethane linkages.

According further to the present invention, synthetic polymeric materials containing a multiplicity of urethane and carbonate linkages in random block distribution are prepared by reacting a polyurethane having free hydroxy end groups attached directly to a nuclear carbon atom of an aromatic nucleus with a dihydroxy compound in which the —OH groups are directly attached to a nuclear carbon atom of an aromatic nucleus and phosgene.

According to a further aspect of the present invention, the said synthetic polymeric materials are produced by reacting an aromatic, aliphatic or aryl aliphatic di-isocyanate with a di(monohydroxyaryl) alkane and thereafter reacting the product with a further quantity of a di(monohydroxyaryl) alkane and phosgene.

It has been found that the bifunctional carbonate grouping $$-O-\underset{\underset{O}{\|}}{C}-O-$$

should preferably be attached in both functions to an aromatic nuclear carbon atom since an attachment to an aliphatic carbon atom reduces resistance to hydrolysis, leading to polymer chain scission during the process of production which makes the achievement of high co-polymer molecular weights difficult. Moreover, the final copolymer containing such linkages has reduced resistance to hydrolytic degradation.

Polyurethanes employed in the first of the said processes, or produced as the end product of the first stage of the second of said processes, are typified by the reaction products of:

4,4-di-isocyanato diphenyl methane
    Tolylene 2:4-di-isocyanate
    p-Phenylene di-isocyanate or 1:6-hexamethylene di-isocyanate with 4,4'-dihydroxy diphenyl-2,2-propane the reaction being effected in an inert organic solvent medium, e.g. acetone or dioxane. An excess of the dihydroxy compound is preferably used in order to ensure that the product has terminal hydroxy groups.

Depending on the choice of reactants, the reaction temperature, the net acidity of the reaction medium and the presence or otherwise of traces of water, the product may be of straight or branched chain structure and may contain, in addition to the urethane linkages of structure:

$$-NH-\underset{\underset{O}{\|}}{C}-O-$$

such linkages as:

$$-NH-\underset{\underset{O}{\|}}{C}-NH-$$

Urea link $$\begin{array}{c}-NH-C=O\\ |\\ -N-C-O-\\ \|\\ O\end{array}$$

Allophanic link $$\begin{array}{c}-NH-C=O\\ |\\ -N-C-NH-\\ \|\\ O\end{array}$$

Biuret link

The formation of these additional types of linkage can be explained by the well-known reactivity of the isocyanate group with compounds containing active hydrogen atoms, e.g.:

Traces of water will react as follows:

$$RNCO + H_2O \longrightarrow RNH_2 + CO_2$$
$$RNH_2 + OCNR \longrightarrow RNHCONHR$$
                            urea link
$$RNHCONHR + OCNR \longrightarrow RNHCONR$$
$$\phantom{RNHCONHR + OCNR \longrightarrow RNHC}\underset{\phantom{xxx}}{|}$$
$$\phantom{RNHCONHR + OCNR \longrightarrow RNHC}CO.NHR$$
                                       biuret link and urethane groups will react as follows:

$$-N\underset{\underset{O}{\|}}{H}CO- + OCNRNCO \longrightarrow -\underset{\underset{CONHRNCO}{|}}{N}.CO.O-$$
                                                           allophanic link The formation of other than the urethane linkages that are desired depends on the relative rate of reaction of the di-isocyanate reactant with —OH and with —OCONH— or —NH₂ or —NHCONH—. Urethane linkages are obviously present in quantity while the exclusion of water from the reaction mixture will prevent the formation and further reaction of amino groups. It is known from Industrial Chemistry, March 1960, page 121 that different di-isocyanates and even isomers of the same di-isocyanate have widely differing relative reactivities to —OH, —OCONH—, —NH₂ and —NHCONH— groupings, and also that for any particular di-isocyanate this relative reactivity varies with temperature, net acidity and catalyst. It is preferred in the processes of the present invention to keep the production of urea, allophanic or biuret linkages to the minimum to avoid reduced solubility and reduced homogeneity during the process and to avoid the risk of reduced clarity in fabrications from the copolymer product. In effect this is a requirement that the —OH/di-isocyanate reaction rate shall substantially exceed the corresponding reaction rates between amine, urea and in particular urethane groupings and di-isocyanate. From that it follows that while any of the well known di-isocyanates can be employed in the process of the present invention, a selection of preferred di-isocyanates can be made based on said relative reactivities; absence of water is highly desirable and temperature, net acidity and catalyst are independent variables which require to be optimised for the chosen reactants. Generally it has been found that temperatures below 100° C. and slightly basic conditions are preferable, the latter being achieved by the addition of small amounts of alkali, e.g. NaOH, Na₂CO₃.

To quote a single example based on 4,4'-dihydroxydiphenyl-2,2-propane and tolylene di-isocyanate, it is known that 2:6 tolylene di-isocyanate reacts with —OH at a rate which does not substantially exceed the rates with urethane groups and, therefore, differs from 2:4-tolylene di-isocyanate for which reaction rate with —OH is substantially higher than the rates with urethane groupings. It has been established that the clarity and softening point of the copolymer product is higher when the polyurethane is prepared using 2:4-tolylene di-isocyanate rather than a 65:35 mixture of 2:4- and 2:6 tolylene di-isocyanates.

The minimum molecular weight of polyurethane, according to the process of this invention, will be obtained by the combination of 2 molecules of dihydroxy compound and 1 molecule of di-isocyanate. Higher molecular weights can be achieved by reducing the said molecular ratio below 2:1 but >1:1, the maximum molecular weight which can be utilised being limited by the reduction of solubility in organic solvents of the polyurethane during its preparation and during its later copolymerisation.

Typical choices of reactants and the corresponding variables are given in the examples, and suitable di-isocyanates and dihydroxy compounds are given below:

p-phenylene di-isocyanate
2:4 tolylene di-isocyanate
1:6-hexamethylene di-isocyanate
4,4'-diphenylmethane di-isocyanate
4,4'-diphenyl di-isocyanate Suitable di-(monohydroxyaryl) alkanes are, for example:

4,4'di-hydroxy diphenyl methane
2,2-(4,4'-dihydroxy diphenyl) propane
1,1-(4,4'-dihydroxydiphenyl)-cyclohexane and includes furthermore methane derivatives which carry besides two hydroxyaryl groups an alkyl residue with at least two carbon atoms and a second alkyl residue with one or more carbon atoms such as:

2,2-(4,4'-dihydroxy-diphenyl)-butane
2,2,-(4,4'-dihydroxy-diphenyl)-pentane

Also included are those di-(monohydroxyaryl)-alkanes, the two aryl residues of which are different, as for example in:

2,2-(4,4'-dihydroxy-3'-methyl-diphenyl)-propane and those containing aryl residues which carry halogen atoms as, for instance:

2,2-(3,5,3',5'-tetrachloro-4,4'-dihydroxy-diphenyl)-propane
(3,3'-dichloro-4,4' dihydroxy diphenyl) methane Other suitable dihydroxy compounds are:

hydroquinone
Resorcinol
4,4'-dihydroxy diphenyl sulphone
4,4'-dihydroxy diphenyl ether
2,6-dihydroxy naphthalene.

The polyurethane, in accordance with this invention, is reacted with a di(monohydroxyaryl) alkane and with phosgene. Suitable di(monohydroxyaryl) alkanes are given in the list above and the same or a different di(monohydroxyaryl) alkane may be chosen for the copolymerisation step as was used in the polyurethane preparation. However, the products are not polycarbonates per se, but are copolymers which contain both urethane linkages and carbonate linkages in random block distribution.

The copolymerisation reaction is thus preferably effected in the presence of aqueous alkali, e.g. aqueous solutions of alkali metal or alkaline earth metal hydroxides such as NaOH, KOH, LiOH, Ca(OH)₂, the corresponding alkali metal or alkaline earth metal salt of the di(monohydroxyaryl) alkane being dissolved or suspended in the aqueous alkaline solution. Furthermore, the reaction is preferably effected in the presence of an inert organic liquid which is water immiscible but is a solvent for the copolymer produced. It is also preferable that the said solvent should be a solvent or swelling agent for the primary polyurethane formed in the first stage of the process. Suitable solvents are, for example, methylene chloride, chloroform, carbon tetrachloride, benzene, toluene, xylene, tetrachlorethane, cyclohexane.

The molecular weight of the final copolymer product can be regulated within wide limits by the addition of mono functional compounds which are capable of reacting with phosgene or with chlorocarbonic acid ester end groups of the copolymer chains and which will terminate said chains, e.g. phenol, t-butyl phenol, aniline, methyl aniline.

When the addition of phosgene to the reaction mixture has ceased it is advantageous to add a catalytic amount of a tertiary amine, e.g. triethylamine, dimethyl aniline, to reduce the time for completion of the reaction and also to reduce the excess of phosgene required. An alternative and advantageous acceleration of the completion of reaction can be obtained after all phosgene has been added to the reaction mixture by the addition of a primary or secondary diamine or di-substituted hydrazine. In this case acceleration takes place because of rapid reaction between terminal chlorocarbonate groups of the copolymer chains and the amino or substitution hydrazine groups of the added compound.

Suitable diamines are:

*Primary.*—p-Phenylene diamine, 4,4'-diaminodiphenyl-methane; NN'-dimethyldiamino diphenyl 1:1 cyclohexane.

*Secondary.*—Piperazine, NN'-dimethyl hexamethylene-diamine.

*Hydrazines.*—Sym-dimethyl hydrazine, sym-di-isopropyl hydrazine.

It is also advantageous to add small amounts of oxidation inhibitors at the beginning of the copolymerisation process, e.g. sodium sulphite, sodium dithionite.

It is preferable that the final copolymer shall result from the application of the process described to a 5–30% mole of di-isocyanate and a total of 95–70% mole of dihydroxy compound, particularly where it is desired to retain solubility of the final copolymer in readily available solvents.

The following examples will serve to illustrate the invention:

Example 1

12.5 g. (0.05 mole) of 4,4'-di-isocyanato-diphenyl methane and 22.8 g. (0.1 mole) of 4,4'-dihydroxy diphenyl-2,2-propane were refluxed together in 50 ml. dry acetone for one hour in the presence of 0.005 g. sodium hydroxide catalyst.

A further 91.2 g. (0.4 mole) 4,4'-dihydroxy diphenyl 2,2-propane in 450 ml. 8% aqueous sodium hydroxide were added together with 0.1 gm. of sodium dithionite and 0.5 g. t-butyl phenol. After the addition of 170 ml. of methylene chloride the mixture was stirred whilst 55 g. phosgene were passed in at a constant rate for 210 minutes. After 43 minutes, 200 ml. of 8% aqueous sodium hydroxide were added. At the end of phosgenation 1 ml. of triethylamine was added and the mixture stirred for another 90 minutes before being acidified with glacial acetic acid. More methylene chloride was added and the solution of polymer washed repeatedly with water. The polymer was then precipitated by pouring into excess acetone.

The product obtained had a K value of 70 and was soluble in methylene chloride and dioxan.

Example 2

25 g. (0.1 mole) of 4,4'-di-isocyanato-diphenyl methane and 45.6 g. (0.2 mole) 4,4'-dihydroxy diphenyl 2,2- propane were refluxed together in 100 ml. dry dioxan for 3 hours.

The polymerisation was completed as Example 1 with the addition of 68.4 g. (0.3 mole) 4,4'-dihydroxy diphenyl 2,2-propane and a total of 48 g. sodium hydroxide with 500 ml. water and 170 ml. methylene chloride. 50 g. phosgene were added.

The product had a K value of 65 and was soluble in methylene chloride and dioxan.

*Example 3*

25 g. (0.1 mole) of 4,4'-di-isocyanato-diphenyl methane and 34.2 g. (0.15 mole) 4,4'-dihydroxy diphenyl 2,2-propane were refluxed together in 100 ml. dry dioxan for 1 hour with 0.01 g. sodium hydroxide catalyst.

The polymerisation was completed as in Example 1 with the addition of 95.5 g. (0.42 mole) 4,4'-dihydroxy diphenyl 2,2-propane and a total of 50.4 g. sodium hydroxide with 500 ml. water and 200 ml. methylene chloride. 55 g. phosgene were added.

The product had a K value of 70 and was soluble in methylene chloride and dioxan.

*Example 4*

522 g. 2,4 tolylene di-isocyanate (3 moles) were slowly added to 1.37 kg. of 4,4'-dihydroxy diphenyl 1-2,2-propane (6 moles) in 1.5 litres of dry acetone and containing 0.5 g. of the sodium salt of the 4,4'-dihydroxy diphenyl-2,2 propane as catalyst. The mixture was refluxed for 2 hours and then cooled to 25° C.

A further 4.25 kg. of the 4,4'-dihydroxy diphenyl 2,2-propane (18.7 moles) together with 13 litres methylene chloride and 1.36 kg. of sodium hydroxide in 21 litres of water were then added. 3 g. of sodium dithionite and 25 g. of phenol to control the molecular weight were also included. 2.55 kg. of phosgene (25.8 moles) were added with stirring and at a temperature of 25° C., over a period of 5 hours, a further, 1.12 kg. (28 moles) of sodium hydroxide in 5 litres of water being added after 2 hours. The stirring of the mixture was continued for a further 5 hours after the addition of the phosgene by which time it was highly viscous. The organic phase was separated and diluted with more methylene chloride and washed separately with water. The copolymer was precipitated by pouring into excess acetone.

The product obtained had a K value of 70, was soluble in methylene chloride and dioxan and could be cast to a clear film.

*Example 5*

8.70 g. (0.05 mole) of an 80:20 mixture of 2,4- and 2,6-tolylene di-isocyanate and 22.8 g. (0.1 mole) of 4,4'-dihydroxy diphenyl 2,2-propane were reacted together in 50 ml. dry acetone for one hour in the presence of 0.1 g. of the sodium salt of 4,4'-dihydroxy diphenyl 2,2-propane.

A further 100 g. (0.4 mole) of 4,4'-dihydroxy-diphenyl sulphone, 36 g. of sodium hydroxide in 450 ml. of water, and 200 ml. of cyclohexane were added. 55 g. of phosgene were passed into the mixture at a constant rate for 210 minutes and after 43 minutes, 16 g. of sodium hydroxide in 200 ml. water were added, the temperature throughout being maintained at approximately 25° C.

After phosgenation the mixture was stirred for a further 5 hours until viscous, and the copolymer isolated in the usual way.

A high molecular weight product soluble in methylene chloride, dioxan and tetrahydrofuran was formed.

*Example 6*

16.8 g. (0.1 mole) of 1:6 hexamethylene di-isocyanate and 48.4 g. (0.2 mole) of 4,4'-dihydroxy diphenyl 2,2-butane were refluxed together in dry acetone with 0.1 g. of the sodium salt of the bisphenol for 2 hours.

The copolymerisation was completed, as Example 2, with the addition of 72.6 g. (0.3 mole) of 4,4'-dihydroxy diphenyl 2,2-butane and a total of 48 g. sodium hydroxide in 500 ml. water and 170 ml. methylene chloride. 50 g. of phosgene were added.

A polymer with a K value of 60 was obtained which was soluble in methylene chloride and dioxan.

As already indicated, the new products have high K-values. They have the desirable properties of the analogous polycarbonates, such as solubility, clarity and dimensional stability which make the polycarbonates suitable for use, for example, in the production of photographic film base. However, the new class of polymers have certain improved physical properties as compared with polycarbonates of comparable molecular dimensions.

Films cast from the said copolymer have increased rigidity as displayed by increased values of Young's modulus, probably due to the presence of —NH— units in the copolymer chains and the opportunities for hydrogen bonding which this provides:

| | Young's modulus, kg./mm.$^2$ |
|---|---|
| Polycarbonate from 2,2-(4,4'-dihydroxy diphenyl)-propane, $K=70$ | 224 |
| Copolymer prepared as Example 1, $K=70$ | 238 |
| Copolymer prepared as Example 4, $K=70$ | 235 |

Furthermore, the equilibrium water content of film conditioned in air of 60% R.H., for example, is higher for copolymer film than for polycarbonate film. For certain photographic processes where high dimensional stability is demanded of the film over a range of temperature this small water content is advantageous since the shrinkage caused by its loss with rising temperature partially compensates for the thermal expansion of the film, a.g.:

| | Equilibrium $H_2O$ content at 60% R.H., percent w./w. |
|---|---|
| Polycarbonate from 2,2-(4,4'-dihydroxy diphenyl)-propane, $K=70$ | 0.24 |
| Copolymer prepared as Example 4, $K=70$ | 0.32 |

The new polymers are suitable for the production of lacquers, moulding compositions (e.g. for injection moulding) and may be formed into films or foils by solution casting or melt casting.

The polymers of this invention provide an excellent material for casting of the film from solution in readily available solvents, such as methylene chloride, tetrachlorethane and dioxane. The normal advantages accruing to solution cast film are obtained, such as freedom from included dirt specks (solutions can be filtered), high surface quality, clarity and transparency, and uniformity of gauge.

The strength, transparency and lack of colour and low moisture absorption of cast film of the polymers of this invention make them suitable for high dimensional stability photographic film base. If the tensile properties are insufficient they can be improved by drawing in one or two directions.

When film formed of the polymers of this invention is to be used as photographic film base it is necessary to apply to it so-called subbing layers to ensure adequate adhesion between the base and the usual type of gelatino photographic emulsion. The following are convenient subbing processes:

(A) Film formed of the copolymer was coated with the following solutions in succession:

(i)

| | |
|---|---|
| Minnesota Mining & Manufacturing Co. adhesive EC. 776 | cc__ 10 |
| Methyl ethyl ketone | cc__ 990 |

(ii)

| | |
|---|---|
| Collodion cotton H65, damped 30% spirit | g__ 15 |
| Methanol | cc__ 860 |
| Methyl acetate, commercial 80% | cc__ 140 |

(iii)

| | | |
|---|---|---|
| Gelatin | g | 10 |
| Salicylic acid | g | 3 |
| Water | cc | 50 |
| Methanol | cc | 600 |
| Ethanol (74° O.P. spirit) | cc | 400 |

(B) Film formed of the copolymer was coated with the following solutions in succession:

(i)

| | | |
|---|---|---|
| Methyl methacrylate/maleic anhydride copolymer of acid value 80 | g | 22.5 |
| Methyl methacrylate/maleic anhydride copolymer of acid value 190 | g | 7.5 |
| Methyl ethyl ketone | cc | 1000 |

(ii)

| | | |
|---|---|---|
| Gelatin | g | 10 |
| Salicylic acid | g | 2 |
| Water | cc | 20 |
| Methanol | cc | 500 |
| Ethanol (74° O.P. spirit) | cc | 500 |

(C) Film formed of the copolymer was coated with the following solutions in succession:

(i)

| | | |
|---|---|---|
| Butadiene/acrylonitrile copolymer 85:15 | g | 2.5 |
| Methyl ethyl ketone | cc | 100 |

(ii)

| | | |
|---|---|---|
| Collodion cotton HX 30–50, damped 30% spirit | g | 2 |
| Methanol | cc | 100 |

(iii)

| | | |
|---|---|---|
| Gelatin | g | 10 |
| Salicylic acid | g | 1 |
| Water | cc | 50 |
| Ethyl alcohol (74° O.P. spirit) | cc | 650 |
| Ethyl acetate | cc | 300 |
| Collodion cotton HL 120–170, damped 30% spirit | g | 2 |
| Formaldehyde 40% solution | cc | 0.5 |

(D) Film formed of the copolymer was coated with the following solutions in succession:

(i)

| | | |
|---|---|---|
| Tripolymer as defined below | g | 4 |
| Methyl ethyl ketone | cc | 80 |
| Dioxane | cc | 20 |

(ii)

| | | |
|---|---|---|
| Collodion cotton HX 30–50, damped 30% spirit | g | 2 |
| Methanol | cc | 100 |

(iii)

| | | |
|---|---|---|
| Gelatin | g | 1 |
| Salicylic acid | g | 0.1 |
| Distilled water | cc | 5 |
| Ethyl alcohol | cc | 80 |
| Ethyl acetate | cc | 15 |
| Collodion cotton HL 120–170, damped 30% spirit | g | 0.2 |
| Formaldehyde 40% solution | cc | 0.05 |

The tripolymer just referred to was prepared by the copolymerisation at 60° C. of:

| | | |
|---|---|---|
| Vinylidene chloride | cc | 85 |
| Acrylonitrile | cc | 15 |
| Maleic anhydride | g | 2 |
| Benzene | cc | 90 |
| Azo-bis-isobutyronitrile | g | 2 |

The reaction product is precipitated with ethyl alcohol, washed and dried at 80° C. in vacuo.

When the film thus subcoated was coated with a standard light sensitive photographic gelatino silver halide emulsion, the emulsion remained firmly adherent during development, fixing and washing.

The polymers of this invention may also be used to advantage to form film serving as base for recording tape, for which purpose such film, especially after unidirectional drawing for orientation, has high dimensional stability and tensile strength, and a lower elongation at break.

What we claim is:

1. A process for the production of a synthetic linear polymeric material which comprises heating a di-isocyanate selected from the class consisting of arylene di-isocyanates and diarylene alkane di-isocyanates with a molar excess of a di(monohydroxyaryl) alkane, in an anhydrous medium, forming a mixture of the product with a di(monohydroxyaryl) alkane, aqueous alkali and a water-immiscible solvent for the polymeric material which is inert to phosgene, and contacting the mixture with phosgene.

2. A process for the production of a synthetic linear polymeric material which comprises heating a di-isocyanate selected from the class consisting of arylene di-isocyanates and diarylene alkane di-isycyanates with substantially two mol equivalents of a di(monohydroxyaryl) alkane, in an anhydrous medium, forming a mixture of the product with a di(monohydroxyaryl) alkane, aqueous alkali and a water-immiscible solvent for the polymeric material which is inert to phosgene, and contacting the mixture with phosgene.

3. A process for the production of a synthetic linear polymeric material which comprises heating a di-isocyanate selected from the class consisting of arylene di-isocyanates and diarylene alkane di-isocyanates with a molar excess of a di(monohydroxyaryl) alkane, in an anhydrous, slightly alkaline, medium, forming a mixture of the product with a di(monohydroxyaryl) alkane, aqueous alkali and a water-immiscible solvent for the polymeric material which is inert to phosgene, and contacting the mixture with phosgene.

4. A process for the production of a synthetic linear polymeric material which comprises heating a di-isocyanate selected from the class consisting of arylene di-isocyanates and diarylene alkane di-isocyanates with a molar excess of a di(monohydroxyaryl) alkane, in an anhydrous medium, at a temperature below 100° C., forming a mixture of the product with a di(monohydroxyaryl) alkane, aqueous alkali and a water-immiscible solvent for the polymeric material which is inert to phosgene, and contacting the mixture with phosgene.

5. A process for the production of a synthetic linear polymeric material which comprises heating a di-isocyanate selected from the class consisting of arylene di-isocyanates and diarylene alkane di-isocyanates with a molar excess of a di(monohydroxyaryl) alkane, in an anhydrous medium, forming a mixture of the product with a di(monohydroxyaryl) alkane, aqueous alkali, a catalytic amount of a tertiary amine, and a water-immiscible solvent for the polymeric material which is inert to phosgene, and contacting the mixture with phosgene.

6. A process for the production of a synthetic linear polymeric material which comprises heating a di-isocyanate selected from the class consisting of arylene di-isocyanates and diarylene alkane di-isocyanates with a molar excess of a di(monohydroxyaryl) alkane, in an anhydrous medium, forming a mixture of the product with a di(monohydroxyaryl) alkane, aqueous alkali and a water-immiscible solvent for the polymeric material which is inert to phosgene, contacting the mixture with phosgene and adding to the mixture a compound selected from the class consisting of primary and secondary amines and di-substituted hydrazines.

7. A process for the production of a synthetic linear polymeric material which comprises heating an arylene di-isocyanate with a molar excess of 4,4'-dihydroxydiphenyl-2,2-propane in an anhydrous, slightly alkaline, medium, forming a mixture of the product with 4,4'-dihydroxydiphenyl-2,2-propane, aqueous alkali and a water-immiscible solvent for the polymeric material which is inert to phosgene, and contacting the mixture with phosgene.

8. A synthetic linear polymeric material which consists of alternating polyurethane sequences A having two free valences and polycarbonate sequences B having two free valences, the free valences of said sequences being satisfied with groups of the formula:

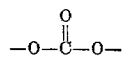

which connects said sequences together, said sequence A consisting of alternating diarylene alkane residues and residues of the class consisting of arylene and diarylene alkane, said residues being connected by urethane groups of the formula:

with the nitrogen of said urethane group being adjacent to the residue of said class, the ratio of diarylene alkane residues to urethane groups being below 2:1 but above 1:1, and said sequence B consisting of diarylene alkane residues linked together by carbonate groups of the formula:

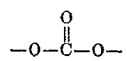

9. A synthetic linear polymeric material according to claim 8 wherein the said sequence A consists of alternating diphenylene alkane residues and arylene residues.

10. A synthetic linear polymeric material according to claim 8 wherein the said sequence A consists of alternating 1,1-diphenylene-1,1-dimethyl methane residues and arylene residues.

11. A synthetic linear polymeric material according to claim 8 wherein the said sequence A consists of alternating 1,1-diphenylene-1,1-dimethyl methane residues and tolylene residues.

12. A synthetic linear polymeric material according to claim 8, in the physical form of a self-supporting film.

References Cited by the Examiner
UNITED STATES PATENTS

| | | | |
|---|---|---|---|
| 2,764,565 | 9/56 | Hoppe | 260—78 |
| 2,799,694 | 7/57 | Ross et al. | 260—77.5 |
| 2,874,046 | 2/59 | Klockgether et al. | 260—47 |
| 2,950,266 | 8/60 | Goldblum | 260—47 |
| 2,999,844 | 9/61 | Muller et al. | 260—47 |

OTHER REFERENCES

Chemical Week, pp. 57–60, June 1, 1957.

WILLIAM H. SHORT, *Primary Examiner.*

H. N. BURSTEIN, LEON J. BERCOVITZ, *Examiners.*